United States Patent [19]
Reimann

[11] 3,878,193
[45] Apr. 15, 1975

[54] PROCESS FOR THE PREPARATION OF GARAMINE DERIVATIVES
[75] Inventor: Hans Reimann, Wayne, N.J.
[73] Assignee: Schering Corporation, Bloomfield, N.J.
[22] Filed: June 26, 1973
[21] Appl. No.: 373,691

[52] U.S. Cl.................... 260/210 R; 260/210 AB
[51] Int. Cl............................................ C07c 129/00
[58] Field of Search .......... 260/210 R, 210 AB, 632

[56] References Cited
OTHER PUBLICATIONS
Goldstein, I. J. et al., "Controlled Degradation of Polysaccharides by Periodute Oxid., Red. and Hydrol."; "Methods in Carbohydrate Chemistry, Volume V, Edit–Whistler, R., 1965, pages 361–370, Academic Press, New York, N.Y.
Pigman, Ward, "The Carbohydrates," page 471, 1957, Academic Press, New York, N.Y.
Crombie, L. et al., Cis and Trans Isomers of Unsat. Alcohols," J. Chem. Soc. London, pages 136–142, 1956.

Primary Examiner—Johnnie R. Brown
Assistant Examiner—Cary Owens
Attorney, Agent, or Firm—Mary S. King

[57] ABSTRACT

Amino-protected derivatives of garamine (useful intermediates) are prepared by treating a pseudotrisaccharide having a garamine moiety glycosidically linked to another pyranoside sugar possessing vicinal hydroxyl groups (preferably vicinal, trans diequatorial hydroxyl groups), said pseudotrisaccharide having amino-protecting groups (preferably carbomethoxy, carbobenzyloxy and acetyl) with a glycol cleaving reagent (preferably sodium meta-periodate) and then treating the secodialdehyde intermediate thereby formed with a base. Typical starting compounds include per-N-carbomethoxyantibiotic JI-20 complex, per-N-carbobenzyloxyantibiotic JI-20 complex, and per-N-acetylantibiotic JI-20 complex.

13 Claims, No Drawings

PROCESS FOR THE PREPARATION OF GARAMINE DERIVATIVES

FIELD OF INVENTION

This invention relates to a novel process and, more specifically, to a process for converting certain pseudotrisaccharides to garamine and amino-protected derivatives thereof, such compounds being pseudodisaccharides useful as intermediates.

In particular, this invention relates to a process for the preparation of 1,3,3'-tri-N-substituted garamine and 1,3-di-N-substituted garamine-3',4'-oxazolidinone from a pseudotrisaccharide having a garamine moiety glycosidically linked to another pyranoside sugar possessing vicinal hydroxyl groups, said pseudotrisaccharide having amino-protecting groups.

PRIOR ART

Garamine, a pseudodisaccharide having antibacterial activity and also being useful as an intermediate, and 1,3,3'-tri-N-substituted garamines, useful as intermediates for producing pseudotrisaccharide antibacterial agents such as gentamicin $X_2$, are described in copending application Ser. No. 296,434, filed Oct. 10, 1972, and now abandoned, of Alan K. Mallams for NOVEL INTERMEDIATES AND METHODS FOR PRODUCING GENTAMICIN $X_2$. The method described and claimed therein for preparing 1,3,3'-tri-N-substituted garamine (and specifically 1,3,3'-tri-N-carbobenzyloxygaramine) comprises selectively hydrolyzing by means of an acid, a pseudotrisaccharide having the garamine moiety and a hex-4-enopyranoside moiety (e.g., sisomicin), said pseudotrisaccharide having N-protected groups (preferably carbobenzyloxy). The 1,3,3'-tri-N-substituted garamine thereby produces (e.g., 1,3,3'-tri-N-carbobenzyloxygaramine) is then convertible to garamine via conventional deblocking methods, such as alkaline hydrolysis.

My invention provides an alternate method for preparing amino-protected garamine derivatives from different starting compounds, i.e. from pseudotrisaccharides having a garamine moiety glycosidically linked to another pyranoside sugar possessing vicinal hydroxyl groups, including known antibiotic pseudotrisaccharides such as Antibiotic G-418, gentamicin B, gentamicin $B_1$, gentamicin $X_2$, JI-20A and JI-20B.

Additionally, by my process a mixture of pseudotrisaccharides having N-protecting groups may be converted together to produce an amino-protected garamine derivative which is easily isolated from side reaction products and any remaining pseudotrisaccharide compounds. Thus, my invention provides a method for preparing garamine derivatives which eliminates the necessity of extensive separation and purification of pseudotrisaccharide starting compounds from antibiotic complexes produced by fermentation.

GENERAL DESCRIPTION OF THE INVENTION

In the process sought to be patented, a pseudotrisaccharide having a garamine moiety glycosidically linked to another pyranoside sugar which possesses vicinal hydroxyl groups, said pseudotrisaccharide having amino-protecting groups, is treated with a glycol cleaving reagent whereby oxidative fission of the pyranoside sugar moiety occurs between the vicinal hydroxyl groups to produce a seco-dialdehyde derivative which, in turn, is treated with a base, whereby cleavage of the seco-pyranoside sugar occurs and there is produced a 1,3,3'-tri-N-substituted garamine which, upon alkaline hydrolysis, is converted to garamine.

Preferred as starting compounds for my process are pseudotrisaccharides wherein the pyranoside sugar glycosidically linked to the garamine moiety possesses vicinal hydroxyl groups which are trans diequatorial to each other including aminoglycosides such as gentamicins B, $B_1$, $X_2$, Antibiotic G-418, Antibiotic JI-20A, Antibiotic JI-20B, and mixtures thereof.

Glycol cleaving reagents useful in my process include lead (IV) salts, e.g. lead tetraacetate and phosphato-lead-(IV)-acids, and periodate salts, preferably sodium meta-periodate.

Basic reagents which are particularly useful in my process to effect cleavage of the seco-pyranoside sugar from the pseudotrisaccharide thus producing 1,3,3'-tri-N-substituted garamine, include alkali metal hydroxides such as potassium hydroxide and sodium hydroxide, alkaline earth metal hydroxides such as magnesium hydroxide, calcium hydroxide and barium hydroxide, alkali sodium ethoxide, potassium ethoxide, sodium propoxide and potassium butoxide, quaternary ammonium hydroxides such as tetramethylammonium hydroxide, and ion exchange resins in the hydroxide form such as Dowex Resin 1X2 and IRA-401S Amberlite resin. In carrying out my process, among the basic reagents I usually use are sodium hydroxide, sodium methoxide, and IRA-401S anion exchange resin in the hydroxide form.

My process is usually carried out in a non-reactive solvent in which the starting pseudotrisaccharide and glycol cleaving reagent and base reagent are soluble. By "non-reactive" is meant a solvent which will not react with the pseudotrisaccharide or the reagents so as to cause transformations which will result in competing side reactions. My process is usually carried out in water, a lower alkanol, or in aqueous alkanol. When utilizing a periodate as cleaving reagent, water is the solvent of choice, although a lower alkanol may also be used; whereas when a lead salt is used as cleaving reagent, an organic solvent such as a lower alkanol or, preferably, a lower alkanoic acid, is conveniently employed.

The term "amino-protecting groups" is well known in the art. Included among such groups which are useful in my process are unsubstituted and functionally substituted acyl, alkoxy-carbonyl, and aryl-alkoxycarbonyl groups, said groups being defined in accordance with their standard art meaning as set forth in standard chemical reference (See Advances in Organic Chemistry, Methods and Results, Raphael, R.A., Taylor, E.C. and Wynberg, H., Vol. 3, Interscience Publishers, New York, 1963, pp. 159–162, 191–193.) Acyl amino-protecting groups include lower alkanoyl groups having up to eight carbon atoms such as acetyl, propionyl, and capryloyl; aroyl groups having up to eight carbon atoms such as benzoyl, toluyl (including o-toluyl, m-toluyl, and p-toluyl), and xyloyl; and arylalkanoyl groups such as phenylacetyl. Examples of alkoxycarbonyl amino-protecting groups are methoxycarbonyl, ethoxycarbonyl, 2,2,2-trichloroethoxycarbonyl, t-butoxycarbonyl and 2-iodoethoxycarbonyl groups. Aryl-alkoxycarbonyl amino-protecting groups include carbobenzyloxy and 4-methoxybenzyloxycarbonyl groups.

When carrying out my process, amino-protecting groups of choice include acetyl, carbobenzyloxy, and particularly carbomethoxy.

Garamine and 1,3,3'-N-substituted garamine, pseudodisaccharides produced by my process, are described in copending application Ser. No. 296,434, filed Oct. 10, 1972, 1972 and now abandoned, and are represented by the following formula I:

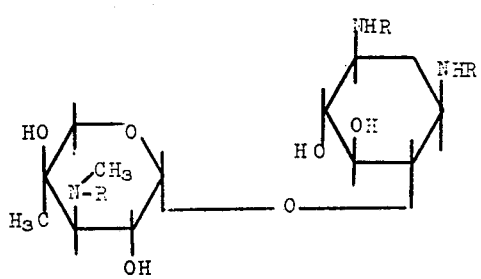

wherein R is an amino-protecting group or hydrogen.

When R is hydrogen, the pseudodisaccharide having the chemical structure O-3-deoxy-4-C-methyl-3-methylamino-β-L-arabinopyranosyl-(1 6)-2-deoxy-D-streptamine as set forth in above formula I, has been named "garamine", which compound possesses antibacterial activity per se, being useful in treating conditions caused by S. aureus, E. coli, P. aeruginosa and other pathogenic organisms.

Compounds of formula I wherein R is an amino-protecting group (preferably carbomethoxy, carbobenzyloxy, or acetyl in the process of this invention) are termed amino-protected derivatives of garamine and are compounds directly produced by my process. These derivatives may be used as is as intermediates for preparing trisaccharides utilizing either the Koenigs-Knorr or the Lemieux reactions with a monosaccharide as the other reagent. For example, gentamicin $X_2$, a known antibacterial agent, may be prepared from 1,3,3'-tri-N-acetylgaramine and the monosaccharide 3,4,6-tri-O-acetyl-2-deoxy-2-nitroso-α-D-glucopyranosyl chloride via the wellknown Lemieux procedure followed by further transformations of the intermediate thereby formed such as set forth in above identified copending application Ser. No. 296,434.

Additionally, amino-protected garamine derivatives of formula I, prepared according to the process of this invention, e.g. 1,3,3'-tri-N-acetylgaramine and 1,3,3'-tri-N-benzoylgaramine, may be "deblocked" (e.g. via alkaline hydrolysis) and the garamine thereby produced may be converted utilizing known techniques to another amino-protected derivatives, e.g. to the 1,3,-3'-tri-N-carbobenzyloxygaramine, which may be more desirable for use in a given sequence of reactions.

Other amino-protected derivatives of garamine which are directly produced by my process and which are included in the term "amino-protected derivatives of garamine" are 1,3-di-substituted garamine-3',4'-oxazolidinone derivatives which are represented by following formula I(a):

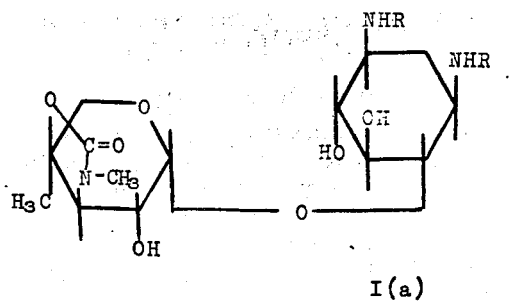

wherein R is a member selected from the group consisting of carbobenzyloxy, carboalkoxy such as carbomethoxy and carboethoxy, and carbo-(2,2,2-trichloroethoxy).

The 4'-hydroxy-protected and amino-protected derivatives of formula I(a) are useful in the same manner as are the amino-protected derivatives of formula I. Thus, for example, gentamicin $X_2$ may be prepared from 1,3-di-N-carbomethoxygaramine-3',4'-oxazolidinone (compound of formula I(a) wherein R is carbomethoxy) and the monosaccharide 3,4,6-tri-O-acetyl-2-deoxy-2-nitroso-α-D-glucopyranosyl chloride via the well-known Lemieux procedure followed by further transformations of the intermediate thereby formed such as disclosed in above identified copending application Ser. No. 296,434.

When the amino-protected group is carboalkoxy, e.g., carbomethoxy, or carboaralkoxy, e.g., carbobenzyloxy, there is obtained a mixture of a compound of formula I together with a compound of formula I(a), the yield of each compound present depending on the basicity of the reaction mixture and length of reaction time, the more basic the reaction mixture and longer the reaction time, the greater the yield of 1,3-di-N-carboalkoxy (carboaralkoxy)-garamine-3',4'-oxazolidinone of formula I(a). The N-carboalkoxy (or carboaralkoxy)-garamine-3',4'-oxazolidinone derivatives of formula I(a) may be derived from the corresponding per-N-carboalkoxy (or per-N-carboaralkoxy)-garamine derivative upon treatment thereof at room temperature with a strong base such as sodium methoxide.

The oxazolidinones of formula I(a) act as amino-protecting groups in the same way as the other amino-protecting groups and, in addition, serve to protect the 4'-hydroxy group. They are deblocked under strong basic conditions. Thus, 1,3,3'-tri-N-carbomethoxygaramine and 1,3-di-N-carbomethoxygaramine-3',4'-oxazolidinone upon treatment with barium hydroxide at elevated temperatures yields garamine. By my invention, a convenient method of preparing garamine is to treat the seco-di-aldehyde derivative of per-N-carbomethoxyantibiotic JI-20 complex at room temperature with sodium methoxide in methanol and thence hydrolyze the resulting 1,3-di-N-carbomethoxygaramine-3',4'-oxazolidinone with barium hydroxide at elevated temperatures.

Particularly useful amino-protected pseudotrisaccharide starting compounds for the process of this invention are amino-glycosides having a garamine moiety glycosidically linked to another pyranoside sugar bearing trans diequatorial vicinal hydroxyl groups, such as aminoglycosides represented by the following formula II and mixtures thereof:

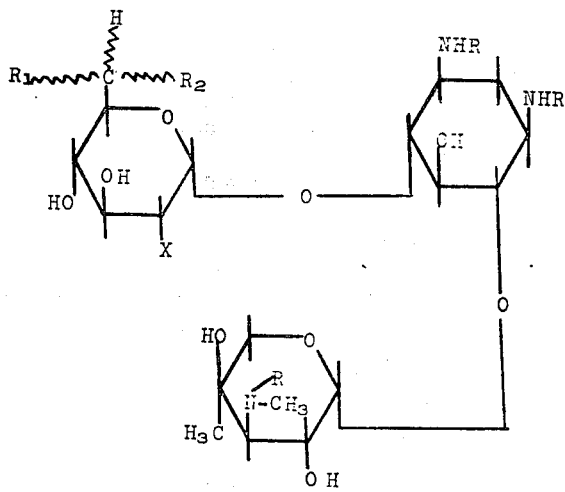

II wherein R is an amino-protecting group as defined hereinabove, preferably carbomethoxy, carbobenzyloxy, or acetyl, $R_1$ is a member selected from the group consisting of hydrogen and methyl; $R_2$ and X are each a member selected from the group consisting of hydroxy and —NHR.

The amino-protected derivatives represented by formula II are derived utilizing known techniques from aminoglycosides of formula II wherein R is hydrogen, such as Antibiotic G-418 (compound of formula II wherein R is hydrogen, $R_1$ is methyl, $R_2$ is hydroxyl, X is amino) which is described in Belgian Pat. No. 787,758 granted Feb. 19, 1973; the well-known gentamicin B (R and $R_1$ are hydrogen, $R_2$ is amino, X is hydroxyl), gentamicin $B_1$ (R is hydrogen, $R_1$ is methyl, $R_2$ is amino, X is hydroxyl), and gentamicin $X_2$ (also known in the art as gentamicin X) (a compound of formula II wherein R and $R_1$ are hydrogen, $R_2$ is hydroxyl, and X is amino); and Antibiotics JI-20A and JI-20B (R is hydrogen, $R_1$ is hydrogen and methyl, respectively, $R_2$ and X are each amino) which are described in copending application Ser. No. 261,753, filed June 12, 1972 and now abandoned of Jan Ilavsky, Aris, P. Bayan, William Charney and Hans Reimann for NEW ANTIBIOTIC FROM MICROMONOSPORA PURPUREA JI-20.

In carrying out my process whereby amino-protected pseudotrisaccharides represented by formula II are degraded to amino-protected pseudodisaccharides represented by formula I and I(a), i.e., to amino-protected garamine derivatives, a pseudotrisaccharide derivative represented by formula II, e.g., 1,3,2′,6′,3″-penta-N-carbomethoxyantibiotic JI-20B (compound of formula II wherein R is carbomethoxy, $R_1$ is methyl, $R_2$ and X are each carbomethoxyamino), is usually dissolved in water or aqueous lower alkanol (e.g., 50 percent aqueous methanol) and treated with an excess of a glycol cleaving reagent, preferably sodium meta-periodate, at room temperature until thin layer chromatographic analysis of an aliquot of the reaction solution indicates the absence of starting compound. When a periodate is employed as reagent, any excess periodate is usually removed by treatment with a calculated amount of ethylene glycol or until the reaction mixture gives a negative starch-iodide test, followed by filtration to remove the inorganic salts. Alternatively, the periodate and iodate ions may be removed by passing the reaction mixture through an IR-45 ion exchange resin column or by precipitation with lead acetate and thence removal of the excess lead ions by means of dilute sulfuric acid. After removal of the periodate and other inorganic salts, there remains an aqueous alkanolic solution of the seco-dialdehyde oxidation product which may be represented by the following formula III:

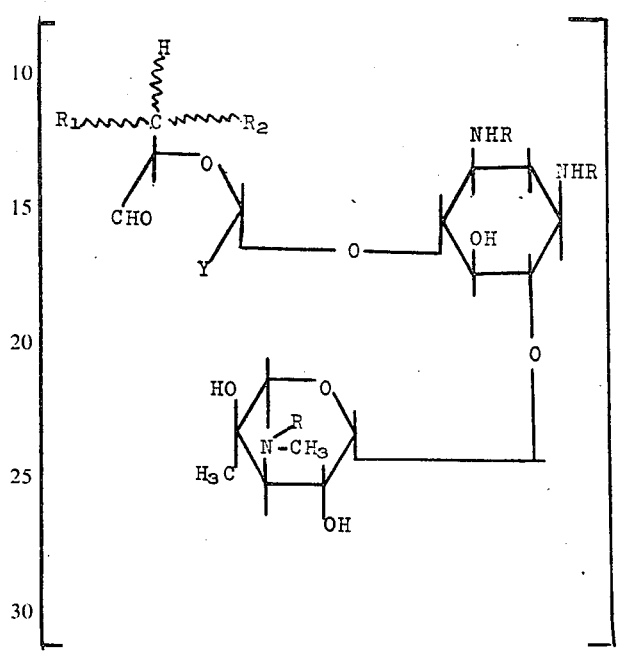

III wherein R, $R_1$ and $R_2$ are as defined in formulae I and II and Y is a member selected from the group consisting of —CHO and

(When per-N-carbomethoxyantibiotic JI-20B is the starting compound, R is carbomethoxy, $R_1$ is methyl, $R_2$ is carbomethoxyamino and X is

)

The seco-dialdehyde intermediate represented by formula III as set forth hereinabove may exist in one or more acetal or hydrated acetal forms; accordingly, formula III is placed in brackets and it is to be understood that in this specification and in the claims, the term "seco-dialdehyde intermediate of formula III" includes the seco-dialdehyde structure set forth in formula III and any equivalent acetyl or hydrated acetal form thereof.

In the conversion of the pseudotrisaccharide (II) to the seco-dialdehyde oxidation product (III) there occurs oxidative fission of the original pyranoside sugar moiety between the vicinal hydroxyl groups. Thus, when a starting pseudotrisaccharide possesses three vicinal hydroxyl groups, e.g., compounds of formula II wherein X is hydroxyl such as in gentamicins B and $B_1$, fission occurs at two places to produce a secodialdehyde of formula III wherein Y is —CHO together with formic acid.

In carrying out the process of this invention, it is not necessary to purify the seco-dialdehyde intermediate III. Thus, after removal of periodate ion and solvent, the crude seco-dialdehyde oxidation product is usually immediately treated with a base in water or a lower alkanol or a mixture thereof at room temperature, e.g., treatment of the seco-dialdehyde intermediate (III) derived from per-N-acetylantibiotic JI-20B in water with aqueous sodium hydroxide until thin layer chromatographic analysis of an aliquot of the reaction solution indicates the absence of starting compound and the presence of mainly 1,3,3'-tri-N-substituted garamine or, when a carboalkoxy is used as an amino-protecting group, e.g., as in per-N-carbomethoxyantibiotic JI-20B, the presence of a 1,3-di-N-substituted-garamine-3',4'-oxazolidinone and/or a 1,3,3'-tri-N-substituted garamine. Isolation of the resulting garamine derivative of formulae I and/or I($a$) is conveniently effected by concentrating the reaction mixture to a small volume, dissolving the residue in a weak base (e.g, 2N-ammonium hydroxide) extracting the basic aqueous mixture with an organic solvent (preferably a halogenated hydrocarbon solvent such as chloroform), and concentrating the aqueous solution to a residue comprising a 1,3,3'-tri-N-substituted garamine of formula I which may be purified utilizing known techniques such as extraction, crystallization and chromatography.

When garamine is desired, the amino-protected garamine derivative of formula I may be deblocked by known methods, perferably, alkaline hydrolysis.

My process may also be carried out utilizing a mixture of pseudotrisaccharides comprising aminoglycosides possessing the requisite garamine and other pyranoside sugar having vicinal hydroxyl groups, as well as other compounds not possessing the requisite groups, and there will be produced 1,3,3'-tri-N-substituted garamine which can be easily separated from other compounds via chromatographic techniques. For example, a mixture of pseudotrisaccharides obtained as described in J. Chromatography 70 171 (1972) by removal of gentamicins A and C from the total antibiotic complex produced in the gentamicin fermentation by Micromonospora purpurea NRRL 2953 (said mixture comprising gentamicins B, B$_1$ and X$_2$together with small quantities of gentamicins A and C) upon conversion to a per-amino-protected mixture (e.g., to a per-N-acetyl pseudotrisaccharide mixture comprising 1,3,6',3''-tetra-N-acetylgentamicin B, 1,3,-6',3''-tetra-N-acetyl-gentamicin B$_1$, 1,3,2',3''-tetra-N-acetylgentamicin X$_2$ together with small quantities of 1,3,2',3''-tetra-N-acetylgentamicin. A and 1,3,2',6',3-''-penta-N-acetylgentamicin C) and treatment of the N-protected mixture according to the process of this invention, yields 1,3,3'-tri-N-substituted garamine (e.g., 1,3,3'-tri-N-acetylgaramine) which is easily separated via chromatographic techniques from side products and residual nonreacting starting pseudotrisaccharides such as gentamicin C.

Similarly, Antibiotic JI-20 Complex (comprising JI-20A and JI-20B) which is produced in the fermentation of Micromonospora purpurea JI-20 (NRRL 5467) and isolated as described in the Preparation and Examples of copending Application U.S. Ser. No. 261,753 filed June 12, 1972, upon conversion to the per-N-carbomethoxy derivative thereof (i.e., to 1,3,2',6',3''-penta-N-carbomethoxyantibiotic JI-20 Complex) and thence treatment with sodium meta-periodate followed by treatment of the seco-dialdehyde intermediate thereby produced with sodium methoxide in methanol yields 1,3-di-N-carbomethoxygaramine-3',4'-oxazolidinone.

My process is described in detail for aminoglycoside derivatives having acetyl and carbomethoxy-N-protecting groups which are preferred amino protecting groups when carrying out the process of this invention. It is to be understood, however, that other lower alkanoyl groups (e.g., propionyl and carpryloyl) and aroyl groups (e.g., benzoyl), are also preferred blocking groups for my process, as well as other hydrocarbonoxycarbonyl groups such as ethoxycarbonyl, 2,2,2-trichloroethoxycarbonyl and benzloxycarbonyl (also termed carbonylethoxy, carbo-(2,2,2-trichloroethoxy) and carbobenzyloxy).

Procedures are set forth hereinbelow to illustrate the best mode contemplated by applicant for carrying out my invention and are not to be construed as limiting the scope thereof.

EXAMPLE 1

Preparation of 1,3,3'-tri-N-acetylgaramine from Antibiotic JI-20A, Antibiotic JI-20B and From Antibiotic JI-20 Complex A. 1,3,2',6',3''-Penta-N-Acetylantibiotic JI-20

The requisite intermediates, i.e. Antibiotic JI-20A, Antibiotic JI-20B, and Antibiotic JI-20 Complex (comprising Antibiotic JI-20A, Antibiotic JI-20B and smaller quantities of gentamicins C$_1$, C$_2$ and C$_{1a}$) are prepared and isolated as described in Examples 1–3 of copending application U.S. Ser. No. 261,753 filed June 12, 1972, of Jan Ilavsky et al. for NEW ANTIBIOTIC FROM MICROMONOSPORA PURPUREA JI-20.

1. Dissolve 5 g. of Antibiotic JI-20 Complex in 150 ml. of methanol and add 15 ml. of acetic anhydride. Allow the reaction mixture to stand at room temperature for 16 hours, filter, and pour the filtrate into 2.5 liters of stirred diethyl ether. Collect the resultant precipitate by filtration, wash the precipitate with ether, and dry in vacuo to obtain 1,3,2',6',3''-penta-N-acetylantibiotic JI-20 complex; m.p. 216°°–224°C; $[\alpha]_D^{26}$ + 130° (water).

2. In a manner similar to that described in Example 1A(1), dissolve 100 mg. of Antibiotic JI-20B in 3 ml. of methanol and add 0.3 ml. of acetic anhydride. Isolate the resultant product in a manner similar to that descrribed to obtain 1,3,2',6',3''-penta-N-acetylantibiotic JI-20B; m.p. 220°–225°C; $[\alpha]_D^{26}$ + 124° (water).

3. Add 4 ml. of acetic anhydride dropwise to a stirred solution of 1 g. of Antibiotic JI-20A in 30 ml. of methanol at 5°C. Stir the reaction mixture at room temperature for 16 hours, concentate to about one half volume in vacuo and add the resultant residue dropwise to 50 ml. of stirred diethyl ether. Isolate the resultant precipitate by filtration, dissolve the precipitate in a minimum volume of aqueous methanol and chromatograph on a column of silica gel. Elute with the lower phase of a 1:1:1 chloroform:methanol:ammonium hydroxide solvent system. Monitor the eluates by thin layer chromatography, combine like fractions containing -penta-N-acetylantibiotic JI-20A and concentrate the combined fractions to a residue. Dissolve the residue in water and lyophilize to obtain 1,3,2',6',3''-penta-N- acetylantibiotic JI-20A; m.p. 210°–220°C; $[\alpha]_D^{26}$ + 141° (water).

4. In above procedures 1A(1), 1A(2) and 1 A(3), by substituting other lower alkanoyl anhydrides, e.g., propionyl anhydride and capryloyl anhydride for acetic anhydride, there is obtained the corresponding per-N-alkanoyl derivative, e.g. the per-N-propionyl and the per-N-capryloyl derivative of Antibiotic JI-20 complex, Antibiotic JI-20B and Antibiotic JI-20A.

B. The Seco-Dialdehyde Derivatives of Penta-A-Acetylantibiotic JI-20

1. Dissolve 350 mg. of 1,3,2',6',3''-penta-N-acetylantibiotic JI-20 Complex in 5 ml. of water and add 240 mg. of sodium meta-periodate. Allow the reaction mixture to stand at room temperature in the dark for three days, add 54 mg. of additional sodium meta-periodate and store in the dark for an additional five days. Filter the reaction mixture and pass the filtrate through a column of IR45 ion exchange resin, eluting with distilled water. Lyophilize the total eluate to obtain a residue comprising the seco-dialdehyde derivative of penta-N-acetylantibiotic JI-20, i.e., a mixture of compounds represented by the following formula 1B wherein R is acetyl, $R_1$ is hydrogen or methyl and Z is the 4-O-linked-1,3,3'-tri-N-acetylgaramine residue.

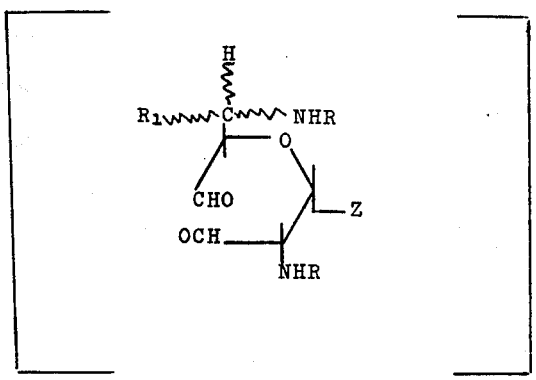

Formula 1B

2. In a manner similar to that described in Example 1B(1), treat each of 1,3,2',6',3''-penta-N-acetylantibiotic JI-20B and 1,3,2',6',3''-penta-N-acetylantibiotic JI-20A with sodium meta-periodate in water, and isolate each of the resultant seco-dialdehyde products to obtain, respectively, the seco-dialdehyde derivative of penta-acetylantibiotic JI-20B represented by above formula 1B wherein R is acetyl, $R_1$ is methyl, and Z is the 4-O-linked-1,3,3'-tri-N-acetylgaramine residue, and the seco-dialdehyde derivative of Antibiotic JI-20A, represented by formula 1B wherein R is acetyl, $R_1$ is hydrogen and Z is the 4-O-linked-tri-N-acetylgaramine residue.

3. In similar manner, treat each of the per-N-propionyl and the per-N-capryloyl derivatives of Antibiotic JI-20 complex, Antibiotic JI-20B and Antibiotic JI-20A with sodium meta-periodate in water to obtain the corresponding per-N-alkanoyl-seco-dialdehyde derivatives represented by formula 1B wherein R is propionyl and capryloyl, respectively, and Z is the 4-O-linked-1,3,3'-tri-N-propionyl (and capryloyl)-garamine residue, respectively.

C. 1,3,3'-Tri-N-Acetylgaramine

1. Dissolve 350 mg. of the seco-dialdehyde derivative of 1,3,2',6',3''-penta-N-acetylantibiotic JI-20 Complex in 7 ml. of water and add 1 ml. of 1N sodium hydroxide solution. Keep the reaction mixture at room temperature for eight days, filter the mixture and lyophilize the filtrate. Triturate the resultant solids with 20 ml. of a 1:1 mixture of chloroform/methanol. Remove the insoluble fraction by filtration and chromatograph the filtrate on a column of silica gel eluting with the lower phase of a 2:1:1 chloroform/isopropanol /ammonium hydoxide solvent mixture. Monitor the fractions by chromatography, combine the like fractions containing 1,3,3'-tri-N-acetylgaramine, and remove the solvent in vacuo to a residue comprising 1,3,3'-tri-N-acetylgaramine; m.p. = 185°–191°C; $[\alpha]_D^{26}$ + 110° (ethanol).

2. Dissolve 500 mg. of the seco-dialdehyde derivative of Antibiotic JI-20 complex in 10 ml. of water. Pass the solution through a column of IRA-401S anion exchange resin in the hydroxide form. Elute with distilled water and lyophilize the total eluate. Chromatograph the resultant residue on silica gel, eluting with the lower phase of a 2:1:1 chloroform/isopropanol/ammonium hydroxide solvent mixture, monitor the fractions by thin layer chromatography, combine the like fractions and remove the solvent in vacuo to a residue comprising 1,3,3'-tri-N-actylgaramine.

3. Treat each of the seco-dialdehyde derivatives of 1,3,2',6',3''-penta-N-acetylantibiotic JI-20B and 1,3,2-',6',3''-penta-N-acetylantibiotic JI-20A with sodium hydroxide in water in the manner described in Example 1C(1). Isolate each of the resultant products in a manner similar to that described to obtain in each case 1,3,3'-tri-N-acetylgaramine.

4. In a manner similar to that described in above Example 1C(1) treat each of the following with aqueous sodium hydroxide at room temperature:
 1. seco-dialdehyde derivative of 1,3,2',6',3''-penta-N-propionylantibiotic JI-20 complex;
 2. seco-dialdehyde derivative of 1,3,2',6',3''-penta-N-propionylantibiotic JI-20B;
 3. seco-dialdehyde derivative of 1,3,2',6',3''-penta-N-propionylantibiotic JI-20A;
 4. seco-dialdehyde derivative of 1,3,2',6',3''-penta-N-capryloylantibiotic JI-20 complex;
 5. seco-dialdehyde derivative of 1,3,2',6',3''-penta-N-capryloylantibiotic JI-20B;
 6. seco-dialdehyde derivative of 1,3,2',6',3''-penta-N-capryloylantibiotic JI-20A, respectively.

Isolate and purify each of the resultant products in a manner similar to that described in Example 1C(1) to obtain, respectively, 1,3,2'-tri-N-propionylgaramine from starting compounds 1–3, and 1,3,3'-tri-N-capryloylgaramine from starting compounds 4–6.

EXAMPLE 2

1,3,3'-Tri-N-Carboalkoxygaramine and 1,3-Di-N-Carboalkoxygaramine- 3',4'-Oxazolidinone From Antibiotics JI-20A, JI-20B and JI-20 Complex A. 1,3,2',6',3''-Penta-N-Carbomethoxyantibiotic JI-20

1. Dissolve 0.9 g. of Antibiotic JI-20B in 10 ml. of water and add 2.7 g. of sodium carbonate followed by 30 ml. of acetone. Add dropwise a solution of 5 g. of methyl chloroformate in 10 ml. of toluene to the stirred suspension with ice cooling. Allow the reaction mixture to warm to room temperature and stir for about 20 hours. Evaporate the solvent in vacuo and chromatograph the resultant residue on silica gel, eluting with the lower phase of a 2:1:1 chloroform/isopropanol /21 percent aqueous ammonium hydroxide solvent system. Monitor the fractions by thin layer chromatography, combine those fractions containing 1,3,2',6',3''-pent-N-carbomethoxyantibiotic JI-20B, and evaporate the combined fractions in vacuo to a residue comprising 1,3,2',6',3''-penta-N-carbomethoxyantibiotic JI-20B; m.p. 175°–180°C $[\alpha]_D^{26}$ + 106° (water).

2. In a manner similar to that described in Example 2A(1), treat Antibiotic JI-20A in aqueous sodium carbonate and acetone with methyl chloroformate. Isolate and purify the resultant product in a manner similar to that described to obtain 1,3,2',6',3''-pent-N-carbomethoxyantibiotic JI-20A.

3. In the manner of Example 2A(1), treat Antibiotic JI-20 complex with methyl chloroformate. Isolate the resultant product in a manner similar to that described to obtain 1,3,2',6',3''-penta-N-carbomethoxyantibiotic JI-20 complex.

4. In above procedures 2A(1), 2A(2) and 2A(3), by using ethyl chloroformate and 2,2,2-trichloroethyl chloroformate instead of methyl chloroformate, there is obtained the corresponding per-N-carboethoxy and per-N-(2,2,2-trichloroethoxy) derivatives of Antibiotics JI-20B, JI-20A and JI-20 complex.

B. Seco-Dialdehyde Derivative of Per-N-Carbomethoxyantibiotic JI-20

1. Add 3.2 g. of sodium meta-periodate with stirring to a solution of 1.58 g. of 1,3,2',6',3''-penta-N-carbomethoxyantibiotic JI-20B in 100 ml. of 50 percent aqueous methanol. Stir the reaction mixture at room temperature for three hours, add about 2 ml. of ethylene glycol, stir for two hours, then remove the resultant precipitate by filtration. Concentrate the filtrate in vacuo to a residue. Triturate the residue in vacuo with methanol, filter, and concentrate the filtrate to a residue comprising the seco-dialdehyde oxidation derivative of penta-N-carbomethoxyantibiotic JI-20 B, which is represented by formula 1B wherein R is carbomethoxy, $R_1$ is methyl, and Z is a 4-O-linked-1,3,3'-tri-N-carbomethoxygaramine residue.

2. In similar manner, treat each of 1,3,2',6',3''-penta-N-carbomethoxyantibiotic JI-20A and 1,3,2',6',3''-penta-N-carbomethoxyantibiotic JI-20 complex with sodium periodate in aqueous methanol followed by treatment of the reaction mixture with ethylene glycol. Isolate each of the resultant products in the manner similar to that described in Example 2B(1), to obtain the seco-dialdehyde derivative of penta-N-carbomethoxyantibiotic JI-20A represented by formula 1B wherein R is carbomethoxy, $R_1$ is hydrogen and Z represents the 4-O-linked-1,3,3'-tri-N-carbomethoxygaramine residue, and the seco-dialdehyde derivative of per-N-carbomethoxyantibiotic JI-20 complex represented by formula 1B wherein R is carbomethoxy, $R_1$ is hydrogen or methyl, and Z is the 4O-linked-1,3,3'-tri-N-carbomethoxygaramine residue.

3. In the procedure described in Example 2B(1), by substituting for per-N-carbomethoxyantibiotic JI-20B other per-N-carboalkoxyantibiotic JI-20 derivatives such as 1,3,2',6',3'' penta-N-carboethoxyantibiotic JI-20B or 1,3,2',6',3''-penta-N-carbo-(2,2,2-trichloroethoxy)-antibiotic JI-20B, there is obtained the corresponding seco-dialdehyde derivative which is represented by formula 1B wherein $R_1$ is methyl and R is carboethoxy and Z is the 4-O-linked-1,3,3'-tri-N-carboethoxygaramine residue and wherein R is carbo-(2,2,2-trichloroethoxy) and Z represents the 4O-linked-1,3,3'-tri-N-carbo-(2,2,2-trichloroethoxy)-garamine residue, respectively.

C. 1,3,3'-Tri-N-Carbomethoxygaramine

1. In a manner similar to that described in Example 1C(1) treat the seco-dialdehyde derivative of 1,3,2',6',3''-penta-N-carbomethoxyantibiotic JI-20B in water with 1N sodium hydroxide solution. Isolate and purify the resultant product in a manner similar to that described to obtain 1,3,3'-tri-N-carbomethoxygaramine; m.p. 148°–152°C; $[\alpha]_D^{26}$ + 92.9° (water).

2. In similar manner, treat each of the seco-dialdehyde derivatives of 1,3,2',6',3''-penta-N-carbomethoxyantibiotic JI-20A and of 1,3,2',6',3''-penta-N-carbomethoxyantibiotic JI-20 complex in water with aqueous sodium hydroxide. Isolate and purify each of the resulting respective products as described in Example 1C(1) to obtain 1,3,3'-tri-N-carbomethoxygaramine.

3. In a manner similar to that described in Example 1C(1), treat each of the following with 1N sodium hydroxide:

1. seco-dialdehyde derivative of 1,3,2',6',3''-penta-N-carboethoxyantibiotic JI-20B;
2. seco-dialdehyde derivative of 1,3,2',6',3''-penta-N-carboethoxyantibiotic JI-20A;
3. seco-dialdehyde derivative of 1,3,2',6',3''-penta-N-carboethoxyantibiotic JI-20 complex;
4. seco-dialdehyde derivative of 1,3,2',6',3''-penta-N-carbo-(2,2,2-trichloroethoxy)-antibiotic JI-20B;
5. seco-dialdehyde derivative of 1,3,2',6',3''-penta-N-carbo-(2,2,2-trichloroethoxy)-antibiotic JI-20A;
6. seco-dialdehyde derivative of 1,3,2',6',3''-penta-N-carbo-(2,2,2-trichloroethoxy)-antibiotic JI-20 complex.

Isolate and purify each of the resultant respective products in a manner similar to that described to obtain 1,3,3'-tri-N-carboethoxygaramine from starting compounds 1–3 and 1,3,3'-tri-N-carbo-(2,2,2-trichloroethoxy)-garamine from starting compounds 4–6.

D. 1,3-Di-N-Carbomethoxygaramine-3',4'-Oxazolidinone

1. Dissolve 12 mg. of the seco-dialdehyde derivative of 1,3,2',6',3''-penta-N-carbomethoxyantibiotic JI-20B in 0.2 ml. of methanol and add 20 mg. of sodium methoxide. Monitor the reaction by thin layer chromatography until the major compound in the reaction mixture is 1,3-di-N-carbomethoxygaramine-3',4'-oxazolidinone. Neutralize the reaction mixture with acetic acid then concentrate the solution in vacuo to a residue. Chromatograph the residue on silica gel, eluting with the lower phase of a 2:1:1 chloroform:isopropanol:ammonium hydroxide solvent system. Monitor the eluate fractions by thin layer chromatography, combine the fractions containing 1,3-di-N-carbomethoxygaramine-[3',4'-oxazolidinone, and concentrate the combined fractions in vacuo to a residue comprising 1,3-di-N-carbomethoxygaramine-3',4'-oxazolidinone; m.p. 134°–137°C; $[\alpha]_D^{26}$ + 69.7° (water).

2. In a similar manner, treat each of the seco-dialdehyde derivatives of 1,3,2',6',3''-penta-N-carbomethoxyantibiotic JI-20A and of 1,3,2',6',3'' -penta-N-carbomethoxyantibiotic JI-20 complex with sodium methoxide in methanol. Isolate and purify each of the resultant respective products in a manner similar to that described to obtain 1,3-di-N-carbomethoxygaramine-3',4'-oxazolidinone.

3. Alternatively, the compound of this Example is prepared as follows: Dissolve 6 mg. of 1,3,3'-tri-N-carbomethoxygaramine in 0.2 ml. of methanol and add 20 mg. of sodium methoxide. Stir at room temperature until thin layer chromatographic analysis indicates 1,3-di-N-carbomethoxygaramine-3',4'-oxazolidinone is the major product. Neutralize the reaction mixture with acetic acid, concentrate the solution in vacuo to a residue, chromatograph the residue on silica gel eluting with the lower phase of a 2:1:1 chloroform:isopropanol : ammonium hydroxide solvent system. Monitor the fractions by thin layer chromatography, combining those fractions containing 1,3-di-N-carbomethoxygaramine-3',4'-oxazolidinone. Concentrate the combined fractions in vacuo to a residue comprising 1,3-di-N-carbomethoxygaramine-3',4'-oxazolidinone.

E. Other 1,3-di-N-Carboalkoxygaramine-3',4'-Oxazolidinones

1. In a manner similar to that described in Example 2D(1) treat each of the following seco-dialdehyde derivatives with sodium methoxide in methanol:

1. seco-dialdehyde derivative of 1,3,2',6',3''-penta-N-carboethoxyantibiotic JI-20B;
2. seco-dialdehyde derivative of 1,3,2',6',3''-penta-N-carboethoxyantibiotic JI-20A;
3. seco-dialdehyde derivative of 1,3,2',6',3''-penta-N-carboethoxyantibiotic JI-20 complex;
4. seco-dialdehyde derivative of 1,3,2',6',3''-penta-N-carbo-(2,2,2-trichloroethoxy)-antibiotic JI-20B;
5. seco-dialdehyde derivative of 1,3,2',6',3''-penta-N-carbo- (2,2,2-trichloroethoxy)-antibiotic JI-20A;
6. seco-dialdehyde derivative of 1,3,2',6',3''-penta-N-carbo-(2,2,2-trichloroethoxy)-antibiotic JI-20 complex.

Isolate and purify each of the resultant products in a manner similar to that described in Example 2D(1) to obtain 1,3-di-N-carboethoxygaramine-3',4'-oxazolidinone from starting compounds 1-3 and 1,3-di-N-carbo-(2,2,2-trichloroethoxy)-garamine-3',4'-oxazolidinone from starting compounds 4-6, respectively.

2. Alternatively, treat each of 1,3,3'-tri-N-carboethoxygaramine and 1,3,3'-tri-N-carbo-(2,2,2-trichloroethoxy)-garamine with sodium methoxide in methanol. In a manner similar to that described in Example 2D(3), isolate and purify each of the resultant products in a manner similar to that described to obtain 1,3-di-N-carboethoxygaramine-3',4'-oxazolidinone and 1,3-di-N-carbo-(2,2,2-trichloroethoxy)-garamine-3',4'-oxazolidinone, respectively.

EXAMPLE 3

Preparation of Garamine From 1,3-Di-N-Carbomethoxygaramine-3',4'-Oxazolidinone

1. Dissolve 0.11 g. of 1,3-di-N-Carbomethoxygaramine-3',4'-oxazolidinone in 10 ml. of water. Add 1 g. of barium hydroxide and heat with stirring at 125°-130°C for 3.5 to 4 hours. Cool the reaction mixture, neutralize with excess carbon dioxide (dry ice), filter the resultant precipitate and triturate the precipitate twice with water. Combine the aqueous filtrate and triturate and evaporate in vacuo to a residue. Triturate the residue with water, filter, and concentrate the filtrate to a residue comprising garamine.

2. Alternatively, the above procedure may also be carried out at 44°C for 96 hours to obtain garamine.

3. Dissolve 1 g. of 1,3-di-N-carbomethoxygaramine-3',4'-oxazolidinone in 100 ml. of 10 percent aqueous sodium hydroxide and heat with stirring at 44°C for 48 hours. Cool the solution and neutralize with Amberlite IRC-50 ion exchange resin. Wash the resin with water and then elute with 0.1N ammonium hydroxide solution. Combine the like fractions and evaporate the combined fractions to a residue. Combine those fractions containing garamine as determined by thin layer chromatography. Concentrate the combined fractions in vacuo to a residue comprising garamine.

EXAMPLE 4

The Preparation of 1,3,3'-Tri-N-carbobenzyloxygaramine and 1,3-Di-N-Carbobenzyloxygaramine-3',4'-Oxazolidinone From 1,3,2',6',3''-Penta-N-Carbobenzyloxyantibiotic JI-20 Complex A. 1,3,2',6',3''-Penta-N-Carbobenzyloxyantibiotic JI-20 Complex Dissolve 1.05 g. of Antibiotic JI-20 complex and 0.5 g. of sodium carbonate in 25 ml. of water. Add 4 ml. of benzylchloroformate and stir overnight at room temperature. Isolate the resultant precipitate by filtration, suspend the precipitate in water and triturate, refilter and precipitate and air dry. Purify by suspending the precipitate in 50 ml. of a 4:1 mixture of hexane/diethyl ether and stir for two hours. Isolate the solids by filtration and precipitate the hexane/ether slurry. Refilter and wash the solids in hexane, and dry in vacuo to obtain . 1,3,2',6',3''-penta-N-carbobenzyloxyantibiotic JI-20 complex; m.p. 245°-248°C.

In similar manner, treat each of Antibiotic JI-20B and Antibiotic JI-20A in aqueous sodium bicarbonate with benzyl chloroformate. Isolate and purify each of the resultant products to obtain 1,3,2',6',3''-penta-N-carbobenzyloxyantibiotic JI-20B and 1,3,2',6',3''-penta-N-carbobenzyloxyantibiotic JI-20A, respectively.

B. Seco-Dialdehyde derivative of 1,3,2',6',3''-penta-N-Carbobenzyloxyantibiotic JI-20 Complex To 1 g. of 1,3,2',6',3''-penta-N-carbenzyloxyantibiotic JI-20 complex in 30 ml. of methanol, add a solution of 460 mg. of sodium meta-periodate in 10 ml. of water and stir at room temperature for 48 hours. Separate the resultant precipitate by filtration, add an additional 460 mg. of sodium meta-periodate in 5 ml. of water to the filtrate, stir the reaction mixture until thin layer chromatographic analysis of an aliquot indicates the presence of mainly the seco-dialdehyde derivative of penta-N-carbobenzyloxyantibiotic JI-20 complex. Separate the resultant precipitate by filtration, concentrate the filtrate to remove the methanol solvent, dilute the aqueous concentrate with water, and extract with chloroform. Wash the combined chloroform extracts with water and concentrate the washed chloroform extracts in vacuo to a residue comprising the seco-dialdehyde derivative of 1,3,2',6',3''-penta-N-carbobenzyloxyantibiotic JI-20 complex which can be used without further purification in the procedures of Example 4C and 4D(2) hereinbelow and which is represented by formula 1B wherein R is carbobenzyloxy, Z represents the 4-O-linked-1,3,3'-tri-N-carbobenzyloxygaramine residue, and $R_1$ is methyl or hydrogen.

In a similar manner, treat each of 1,3,2',6',3''-penta-N-carbobenzyloxyantibiotic JI-20A and 1,3,2',6',3''-penta-N-carbobenzyloxyantibiotic JI-20B with sodium meta-periodate in aqueous methanol. Isolate and purify each of the resultant respective products in a manner similar to that described to obtain the seco-dialdehyde derivative of 1,3,2',6',3''-penta-N-carbobenzyloxyantibiotic JI-20A (a compound represented by formula 1B wherein R is carbobenzyloxy, $R_1$ is hydrogen, and Z represents the 4-O-linked-1,3,3'-tri-N-carbobenzyloxygaramine residue), and the seco-dialdehyde derivative of 1,3,2',6',3''-penta-N-carbobenzyloxyantibiotic JI-20B (a compound represented by formula 1B wherein R is carbobenzyloxy, $R_1$ is methyl and Z represents the 4-O-linked-1,3,3'-tri-N-carbobenzyloxygaramine residue).

C. 1,3,3'-Tri-N-Carbobenzyloxygaramine and 1,3-Di-N-Carbobenzyloxygaramine-3',4'-Oxazolidinone Dissolve 50 mg. of the seco-dialdehyde derivative of 1,3,2',6',3''-penta-N-carbobenzyloxyantibiotic JI-20 complex in 4 ml. of methanol and add 0.1 ml. of 1N sodium hydroxide solution. Allow the reaction mixture to stand at room temperature until thin layer chromatographic analysis of an aliquot of the solution on silica gel plates using an 8 percent methanol in chloroform solvent system shows the major product to be 1,3,3'-tri-N-carbobenzyloxygaramine together with 1,3-di-N-carbobenzyloxygaramine-3',4'-oxazolidinone (about 4 days). Neutralize the reaction mixture with acetic acid or dilute hydrochloric acid. Concentrate the neutralized solution in vacuo and chromatograph the resultant residue on silica gel, eluting with a 5 percent methanol in chloroform solvent system. Monitor the fractions by thin layer chromatography and combine the two like sets of fractions. Concentrate each set of the combined fractions to obtain a residue comprising 1,3,3'

D and 1,3-di-N-carbobenzyloxygaramine-3',4'-oxazolidinone, respectively. D. 1,3-Di-N-Carbobenzyloxygaramine-3',4'-Oxazolidinone 1. Dissolve 0.4 g. of 1,3,3'-tri-N-carbobenzyloxygaramine in 8 ml. of methanol. Cool to 5°C and add with stirring 0.8g of sodium methoxide. Allow the reaction mixture to stand at room temperature for two hours, neutralize with 2N hydrochloric acid, then add 16 ml. of water dropwise with stirring. Separate the resultant precipitate by filtration and wash with water. Dissolve the precipitate in a minimum volume of methanolic chloroform and chromatograph on a column of silica gel, eluting with 4 percent methanol in chloroform. Monitor the fractions by thin layer chromatography, combine like fractions and evaporate the combined like fractions in vacuo to a residue comprising 1,3-di-N-carbobenzyloxygaramine-3',4'-oxazolidinone; m.p. 235°–237°C; $[\alpha]D^{26} + 41.1$ °(dimethyl sulfoxide.).

2. Alternatively, treat the seco-dialdehyde derivative of 1,3,2'6',3''-penta-N-carbobenzyloxyantibiotic JI-20 complex with sodium methoxide in methanol. In a manner similar to that described in Example 2D(1), isolate and purify the resultant product in a manner similar to that described to obtain 1,3-di-N-carbobenzyloxygaramine-3',4'-oxazolidinone.

3. Alternatively, treat each of the seco-dialdehyde derivatives of 1,3,2',6',3''-penta-N-carbobenzyloxyantibiotic JI-20A and of 1,3,2',6',3''-penta-N-carbobenzyloxyantibiotic JI-20B with aqueous sodium hydroxide in the manner described in Example 4C or with sodium methoxide in methanol in the manner described in Example 4D(2) to obtain 1,3,3'-tri-N-carbobenzyloxygaramine and 1,3-di-N-carbobenzyloxygaramine-3',4'-oxazolidinone, respectively.

EXAMPLE 5

Preparation of 1,3,3'-Tri-N-Acetylgaramine From 1,3,2',3''-Tetra-N-Acetylantibiotic G-418 Micromonospora A. 1,3,2',3''-Tetra-N-Acetylantibiotic G-418

To Antibiotic G-418 (2.0 g) in methanol (100 ml.) add acetic anhydride (5 ml.), then allow the reaction mixture to stand at room temperature for 2.5 hours. Concentrate the solution in vacuo, redissolve the resultant residue in methanol (20 ml.), and add the methanol solution dropwise to 1 liter of anhydrous ether. Separate by filtration the resultant precipitate to obtain 2.5 g. of 1,3,2'3''-tetra-N-acetylantibiotic G-418 as a colorless solid, which, upon thin layer chromatographic analysis on silica gel G.F. utilizing chloroform:methanol:ammonium hydroxide (1:1:1) as developing solvent shows a single spot more mobile than Antibiotic G-418.

B. Seco-Dialdehyde Derivative of 1,3,2',3''-Tetra-N-Acetylantibiotic G-418

In a manner similar to that described in Example 2B(1), treat 1,3,2',3''-tetra-N-acetylantibiotic G-418 with sodium meta-periodate in aqueous methanol. Isolate and purify the resultant product in a manner similar to that described to obtain a seco-dialdehyde derivative of 1,3,2',3''-tetra-N-acetylantibiotic G-418 which is used without further purification in the following procedure 5C and which is represented by the following formula 5B wherein R is acetyl and Z represents the 4-O-linked-1,3,3'-tri-N-acetylgaramine residue:

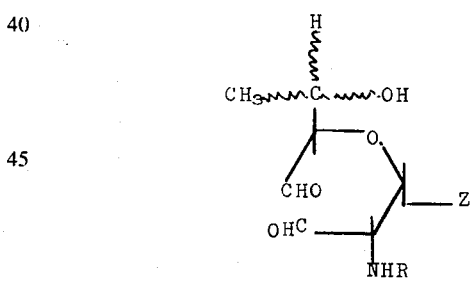

FORMULA 5B

C. 1,3,3'-Tri-N-Acetylgaramine

In a manner similar to that described in Example 1C(1), treat the seco-dialdehyde derivative of 1,3,2',3''-tetra-N-acetylantibiotic G-418 with 1N sodium hydroxide. Isolate and purify the resultant product in a manner similar to that described to obtain 1,3,3'-tri-N-acetylgaramine.

EXAMPLE 6

Preparation of 1,3,3'-Tri-N-Carbobenzyloxygaramine and 1,3-Di-N-Carbobenzyloxygaramine-3',4'-Oxazolidinone From 1,3,2',3''-Tetra-N-Carbobenzyloxyantibiotic G-418

A. 1,3,2',3''-Tetra-N-Carbobenzyloxyantibiotic G-418

In a manner similar to that described in Example 4A, treat Antibiotic G-418 in aqueous sodium carbonate with benzyl chloroformate. Isolate the resultant product in a manner similar to that described to obtain 1,3,-2',3''-tetra-N-carbobenzyloxyantibiotic G-418.

B. Seco-Dialdehyde Derivative of 1,3,2',3''-Tetra-N-Carbobenzyloxyantibiotic G-418

In a manner similar to that described in Example 2B(1) treat 1,3,2',3''-tetra-N-carbobenzyloxyantibiotic G-418 with sodium meta-periodate in aqueous methanol. Isolate the resultant product in a manner similar to that described to obtain a seco-dialdehyde derivative of 1,3,2',3''-tetra-N-carbobenzyloxyantibiotic G-418 which is represented by formula 5B hereinabove wherein R is carbobenzyloxy and Z represents the 4-O-linked-1,3,3'-tri-N-carbobenzyloxy radical.

C. 1,3,3'-Tri-N-Carbobenzyloxygaramine and 1,3-Di-N-Carbobenzyloxygaramine-3',4'-Oxazolidinone In a manner similar to that described in Example 4C treat the seco-dialdehyde derivative of 1,3,2',3''-tetra-N-carbobenzyloxyantibiotic G-418 in methanol with aqueous sodium hydroxide. Isolate and purify each of the resultant products in a manner similar to that described to obtain 1,3,3'-tri-N-carbobenzyloxygaramine and 1,3di-N-carbobenzyloxygaramine-3',4'-oxazolidinone, respectively.

D. 1,3-Di-N-Carbobenzyloxygaramine-3',4'-Oxazolidinone

1. In a manner similar to that described in Example 2D(1) treat the seco-dialdehyde derivative of 1,3,2',3''-tetra-N-carbobenzyloxyantibiotic G-418 with sodium methoxide in methanol. Isolate and purify the resultant product in a manner similar to that described to obtain 1,3-di-N-carbobenzyloxygaramine-3',4'-oxazolidinone.

EXAMPLE 7

Preparation of 1,3,3'-Tri-N-Acetylgaramine From Each of Gentamicins B, $B_1$, and $X_2$ or From a Mixture Thereof A. Tetra-N-Acetylgentamicins 1. In a manner similar to that described in Example 1A(1) treat each of gentamicin B, gentamicin $B_1$ and gentamicin $X_2$ with acetic anhydride in methanol. Isolate and purify each of the resultant products in a manner similar to that described to obtain respectively: 1,3-,6',3''-tetra-N-acetylgentamicin B as the tetra-hydrate; $[\alpha]_D^{26}$ + 119° (water);

1,3,6',3''-tetra-N-acetylgentamicin $B_1$ as the tetrahydrate; $[\alpha]_D^{26}$ + 134° (water), and 1,3,2',3''-tetra-N-acetylgentamicin $X_2$.

2. The requisite starting compound mixture comprising gentamicins B, $B_1$ and $X_2$ together with smaller quantities of gentamicins A and C, is prepared utilizing known procedures (J. Chromatograph 70, 171–173 (1972)) by removing gentamicins C and A from the antibiotic complex product in the gentamicin fermentation by micromonspora purpurea NRRL 2953.

Treat a mixture comprising gentamicins B, $B_1$ and $X_2$ together with small quantities of gentamicins A and C with acetic anhydride in methanol in the manner of Example 1A. Isolate the resultant product in a manner similar to that described in Example 1A to obtain a product mixture comprising mainly 1,3,6',3''-tetra-N-acetylgentamicin B, 1,3,6',3''-tetra-N-acetylgentamicin B, 1,3,6',3''-tetra-N-acetylgentamicin $B_1$ and 1,3,2',3''

B. -tetra-N-acetylgentamicin $X_2$. B. Seco-Dialdehyde Derivative of Each of Gentamicin B, $B_1$ and $X_2$ or a Mixture Thereof 1. In a manner similar to that described in Example 2B(1), treat each of 1,3,6',3''-tetra-N-acetylgentamicin B; 1,3,6',3''-tetra-N-acetylgentamicin $B_1$ and 1,3,2',3''-tetra-N-acetylgentamicin $X_2$ with sodium meta-periodate in aqueous methanol followed by treatment with ethylene glycol in the manner of Example 2B(1). Isolate and purify each of the resultant products in similar manner to obtain the corresponding seco-dialdehyde derivative of 1,3,6',3''-tetra-N-acetylgentamicin B represented by following formula 7B(1) wherein R is acetyl, $R_1$ is hydrogen, and Z represents the 4-O-linked-1,3,3'-tri-N-acetylgaramine residue; the secodialdehyde derivative of 1,3,2',3''-tetra-N-acetylgentamicin $B_1$ represented by formula 7B(1) wherein R is acetyl, $R_1$ is methyl and Z represents the 4O-linked-1,3,3'-tri-N-acetylgaramine residue and 1,3,2',3''-tetra-N-acetylgentamicin $X_2$ represented by following formula 7B(2) when R is acetyl and Z represents the 4-O-linked-1,3,3'-tri-N-acetylgaramine residue; respectively:

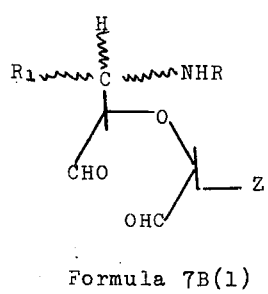
Formula 7B(1)

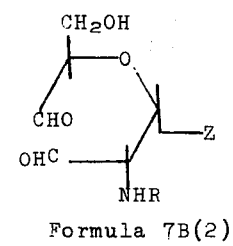
Formula 7B(2)

2. Similarly, treat the tetra-N-acetylgentamicin mixture comprising tetra-N-acetylgentamicins B, $B_1$ and $X_2$ with sodium meta-periodate in aqueous methanol followed by treatment with ethylene glycol. Isolate and purify the product mixture to obtain a product mixture comprising the seco-dialdehyde derivatives of tetra-N-acetylgentamicins B, $B_1$ and $X_2$ which are represented by structural formulae 7B(1) and 7B(2) wherein R is acetyl, Z represents a 4-O-linked-1,3,3'-tri-N-acetylgaramine radical and $R_1$ can be hydrogen or methyl.

C. 1,3,3'-tri-N-Acetylgaramine

1. In a manner similar to that described in Example 1C(1), treat each of the seco-dialdehyde derivatives of 1,3,6',3''-tetra-N-acetylgentamicins B and $B_1$ and of 1,3,2',3''-tetra-N-acetylgentamicin $X_2$ in water with 1N sodium hydroxide. Isolate and purify each of the resultant products in a manner similar to that described to obtain 1,3,3'-tri-N-acetylgaramine.

EXAMPLE 8

Preparation of 1,3,3'-tri-N-carbobenzyloxygaramine and 1,3-di-N-carbobenzyloxygaramine-3',4'-oxazolidinone From Each of gentamicins B, $B_1$, $X_2$ or a Mixture Thereof A. Per-N-carbobenzyloxygentamicin B 1. Add 9 g. of gentamicin B to 32 ml. of saturated aqueous sodium bicarbonate in 60 ml. of water. While keeping the mixture cooled in an ice bath, add dropwise with stirring 15.48 g. of carbobenzyloxy chloride over a 30 minute period keeping the solution basic (pH ca8) by addition of saturated aqueous sodium bicarbonate (final pH ca9–10). Stir the reaction mixture at room temperature overnight, decant the mixture and triturate the residue with ice water until it solidifies. Air dry the solid for 24 hours to obtain 15 g. of 1,3,6′,3″-tetra-N-carbobenzyloxygentamicin B. Thin layer chromatographic analysis on silica gel plate developed with a solvent mixture comprising chloroform, methanol, ammonium hydroxide (1:1:1), indicates one spot at the solvent front with no starting compound.

2. In a similar manner, treat each of gentamicin $B_1$, and gentamicin $X_2$ in aqueous sodium bicarbonate with carbobenzyloxy chloride. Isolate and purify each of the resultant products in a manner similar to that described, to obtain 1,3,6′,3″-tetra-N-carbobenzyloxygentamicin $B_1$ and 1,3,2′,3″-tetra-N-carbobenzyloxygentamicin $X_2$, respectively.

3. Mixture of Tetra-N-carbobenzyloxygentamicins $B,B_1,X_2$ To 10 g. of a product mixture comprising gentamicin B, gentamicin $B_1$, gentamicin $X_2$ together with small quantities of gentamicins A and C and other minor components in 40 ml. of methanol, add 250 ml. of water and 10 ml. of saturated aqueous sodium bicarbonate. Cool the mixture in an ice bath, and over a 30 minute period, add dropwise 17.06 g. of carbobenzyloxy chloride keeping the solution at a pH in the range 8–10 by adding saturated aqueous sodium bicarbonate solution (final pH ca9). Stir for 16 hours then add saturated aqueous sodium bicarbonate solution to bring the solution at about pH 9, then stir for an additional 3 hours. Decant the reaction mixture and add water to the gummy residue until it solidifies. Separate the solid from the water washes and dry the resultant solid at 45°C over phosphorous pentoxide in vacuo for 24 hours to give 12.9 g. of a mixture comprising mainly 1,3,6′,3″-tetra-N-carbobenzyloxygentamicin B, 1,3,6-′,3″-tetra-N-carbobenzyloxygentamicin $B_1$ and 1,3,2′,3″-tetra-N-carbobenzyloxygentamicin $X_2$. A thin layer chromatographic analysis of the product on silica gel G.F. developed with a solvent mixture comprising chloroform, methanol, ammonium hydroxide (1:1:1) indicates one spot at the solvent front with no starting compound.

B. Seco-Dialdehyde Derivatives of Per-N-Carbobenzyloxygentamicins B, $B_1$, $X_2$ and Mixtures Thereof 1. In a manner similar to that described in Example 4B, treat each of 1,3,6′,3″-tetra-N-carbobenzyloxygentamicin B, per-N-carbobenzyloxygentamicin $B_1$ and per-N-carbobenzyloxygentamicin $X_2$ in aqueous methanol with sodium meta-periodate followed by treatment with ethylene glycol according to the procedure of Example 4B. Isolate the resultant respective products thereby formed in a manner similar to that described to obtain the seco-dialdehyde derivative of 1,3-,6′,3″-tetra-N-carbobenzyloxygentamicin B (compound of formula 7B(1)) wherein R is carbobenzyloxy, $R_1$ is hydrogen and Z represents the 4-O-linked-tri-N-carbobenzyloxygaramine radical), the seco-dialdehyde derivative of per-N-carbobenzyloxygentamicin $B_1$ represented by formula 7B(1) wherein R is carbobenzyloxy, $R_1$ is methyl, and Z represents the 4-O-linked-tri-N-carbobenzyloxygaramine residue, and the seco-dialdehyde derivative of per-N-carbobenzyloxygentamicin $X_2$ represented by formula 7B(2) wherein R is carbobenzyloxy and Z represents the 4O-linked-tri-N-carbobenzyloxygaramine residue, respectively.

2. Similarly, treat a mixture of tetra-N-carbobenzyloxygentamicins B, $B_1$ and $X_2$ with sodium metaperiodate in aqueous methanol followed by treatment with ethylene glycol. Isolate the resultant product in a manner similar to that described, to obtain a product mixture comprising the seco-dialdehyde derivatives of tetra-N-carbobenzyloxygentamicins B, $B_1$ and $X_2$.

The seco-dialdehyde derivatives prepared as described hereinabove may be used without further purification in the following procedures 8C and 8D.

C. 1,3,3′-Tri-N-Carbobenzyloxygaramine

In a manner similar to that described in Example 4C, treat the seco-dialdehyde derivative of tetra-N-carbobenzyloxygentamicin B with sodium hydroxide in aqueous methanol. Isolate the resultant product in a manner similar to that described to obtain a product mixture comprising 1,3,3′-tri-N-carbobenzyloxygaramine and 1,3-di-N-carbobenzyloxygaramine-3′,4′-oxazolidinone. Separate each of the foregoing compounds via chromatography in the manner described to obtain 1,3,3′-tri-N-carbobenzyloxygaramine and 1,3-di-N-carbobenzyloxygaramine-3′,4′-oxazolidinone.

In a similar manner, treat each of the seco-dialdehyde derivatives of tetra-N-carbobenzyloxygentamicin $B_1$, of tetra-N-carbobenzyloxygentamicin $X_2$, and a product mixture comprising the seco-dialdehyde derivatives of gentamicins B, $B_1$ and $X_2$ with sodium hydroxide in aqueous methanol to obtain in each case a product comprising 1,3,3′-tri-N-carbobenzyloxygaramine in admixture with 1,3-di-N-carbobenzyloxygaramine-3′,4′-oxazolidinone which, upon chromatography in the manner described in Example 4C yields 1,3,3′-tri-N-carbobenzylgaramine and 1,3-di-N-carbobenzyloxygaramine-3′,4′-oxazolidinone, respectively.

D. 1,3-Di-N-Carbobenzyloxygaramine-3′,4′-Oxazolidinone

1. In a manner similar to that described in Example 2D(3) treat 1,3,3′-tri-N-carbobenzyloxygaramine with sodium methoxide in methanol. Isolate and purify the resultant product in a manner similar to that described to obtain 1,3-di-N-carbobenzyloxygaramine-3′,4′-oxazolidinone.

2. Alternatively, the compound of this Example is prepared by treating each of the seco-dialdehyde derivatives of tetra-N-carbobenzyloxygentamicins B, $B_1$ and $X_2$ or a mixture thereof with sodium methoxide in methanol according to the procedure of Example 2D(1). Isolate and purify the resultant product in each case to yield 1,3-di-N-carbobenzyloxygaramine-3′,4′-oxazolidinone.

EXAMPLE 9

1,3,3′-Tri-N-Benzoylgaramine

A. 1,3,6′3″-tetra-N-Benzoylgentamicin B

1. Dissolve 4.82 g. of gentamicin B in 250 ml. of dried pyridine, and cool to 0°C. Add with stirring 21.1 g. of benzoyl chloride, then allow the reaction mixture to stand at room temperature for 24 hours. Evaporate the pyridine in vacuo, dissolve the resultant residue in 500 ml. of chloroform, and wash the chloroform solution with aqueous sodium bicarbonate solution, 0.1N sulfuric acid and then saturated sodium chloride solution. Dry the washed chloroform solution over sodium sulfate, filter and evaporate to a residue. Dissolve the residue in 500 ml. of methanol, treat with a small quantity of sodium methoxide and allow to stand at room temperature for 24 hours. Evaporate the methanol solution in vacuo to a residue, then redissolve the residue in a minimum volume of methanol and add the methanolic solution to a large volume of stirred ether. Filter and dry the resultant precipitate comprising 1,3,6',3''-tetra-N-benzoylgentamicin B.

2. In a similar manner, treat each of the following with benzoyl chloride in pyridine at 0°C followed by sodium methoxide in methanol: gentamicin $B_1$, gentamicin $X_2$, a mixture comprising gentamicins B, $B_1$ and $X_2$, Antibiotic G-418, Antibiotic JI-20A, Antibiotic JI-20B, and Antibiotic JI-20 complex.

Isolate and purify each of the resultant products in a manner similar to that described hereinabove to obtain respectively 1,3,6',3''-tetra-N-benzoylgentamicin $B_1$; 1,3,2',3''-tetra-N-benzoylgentamicin $X_2$; a product mixture comprising tetra-N-benzoylgentamicins B, $B_1$ and $X_2$; 1,3,2',3''-tetra-N-benzoylantibiotic G-418; 1,3,2',6',3''penta-N-benzoylantibiotic JI-20A; 1,3,2',6',3''-penta-N-benzoylantibiotic JI-20B; 1,3,2', 6',3''-penta-N-benzoylantibiotic JI-20 complex.

B. Seco-Dialdehyde Derivative of 1,3,6',3''-Tetra-N-BenzoylGentamicin B

In a manner similar to that described in Example 2B(1), treat 1,3,6',3''-tetra-N-benzoylgentamicin B with sodium meta-periodate in aqueous methanol at room temperature until thin layer chromatographic analysis of an aliquot of the reaction solution indicates the absence of starting compound. Add ethylene glycol dropwise until the solution gives a negative starch iodide test, then remove the resultant precipitate by filtration and concentrate the filtrate to a residue in vacuo. Triturate the residue with methanol, filter and concentrate the filtrate to a residue comprising the seco-dialdehyde derivative of 1,3,6',3''-tetra-N-benzoylgentamicin B represented by formula 7B(1) when R is benzoyl, $R_1$ is hydrogen and Z is the per-N-benzoylgaramine radical.

C. 1,3,3'-Tri-N-Benzoylgaramine

In a manner similar to that described in Example 1C(1) treat the seco-dialdehyde derivative of 1,3,6',3''-tetra-N-benzoylgentamicin B with aqueous sodium hydroxide. Isolate and purify the resultant product in a manner similar to that described to obtain 1,3,3'-tri-N-benzoylgaramine.

In similar manner, subject the following per-N-benzoyl derivatives to the procedures of Examples 9B and 9C to obtain 1,3,3'-tri-N-benzoylgaramine:

1,3,6',3''-tetra-N-benzoylgentamicin B;
1,3,2',3''-tetra-N-benzoylgentamicin $X_2$;
a mixture of tetra-N-benzoylgentamicin B, $B_1$ and $X_2$;
1,3,2',3''-tetra-N-benzoylantibiotic G-418;
1,3,2',6',3''-penta-N-benzoylantibiotic JI-20A;
1,3,2',6',3''-penta-N-benzoylantibiotic JI-20B and mixtures thereof; and
1,3,2',6',3''-penta-N-benzoylantibiotic JI-20 complex.

EXAMPLE 10

Alternate Procedure for Preparing 1,3,3'-tri-N-Acetylgaramine From Tetra-N-Acetylgentamicin B Add 1.32 mg. of sodium meta-periodate to a solution of 200 mg. of 1,3,6',3''-tetra-N-acetylgentamicin B in 20 ml. of water. Stir the reaction mixture in the dark until thin layer chromatographic analysis of an aliquot indicates the absence of starting compound. To this solution containing the seco-dialdehyde derivative of tetra-N-acetylgentamicin B, add 40 ml. of saturated aqueous sodium bicarbonate and heat the mixture in the steambath for 1.5 hours. Evaporate the reaction mixture to a residue, then extract the residue several times with refluxing methanol. Evaporate the combined methanol extracts to a residue and chromatograph this residue over silica gel using the lower phase of a 2:1:1 chloroform/methanol/concentrated ammonium hydroxide system. Monitor the fractions by thin layer chromatography and combine those fractions containing 1,3,3'-tri-N-acetylgaramine. Evaporate the combined fractions to a residue comprising 1,3,3'-tri-N-acetylgaramine; $[\alpha]_D^{26} + 95.4°$ (water).

I claim:

1. The process for preparing a garamine derivative having amino-protecting groups which comprises treatment of a pseudotrisaccharide having a garamine moiety 4-O-glycosidically linked to another pyranoside sugar which possesses an amino function and vicinal hydroxyl groups, said pseudotrisaccharide having amino-protecting groups selected from the group consisting of benzyloxycarbonyl, lower alkoxycarbonyl, (2-,2,2-trichloroethoxy)-carbonyl, lower alkanoyl and aroyl having up to 8 carbon atoms, with a glycol cleaving reagent selected from the group consisting of a periodate salt and a lead (IV) salt; and treatment of the seco-dialdehyde derivative with a basic reagent selected from the group consisting of alkali metal hydroxides, alkaline earth metal hydroxides, alkali metal lower alkoxides, quaternary ammonium hydroxides, and ion exchange resins in the hydroxide form.

2. The process of claim 1 wherein said pseudotrisaccharide has a garamine moiety 4-O-glycosidically linked to another pyranoside sugar which possesses an amino function and vicinal, trans diequatorial hydroxyl groups.

3. The process of claim 2 followed by treatment of the garamine derivative having amino-protecting groups with alkali whereby garamine is formed.

4. The process of claim 2 for preparing a garamine derivative having amino-protecting groups of the following formulae I and I(a);

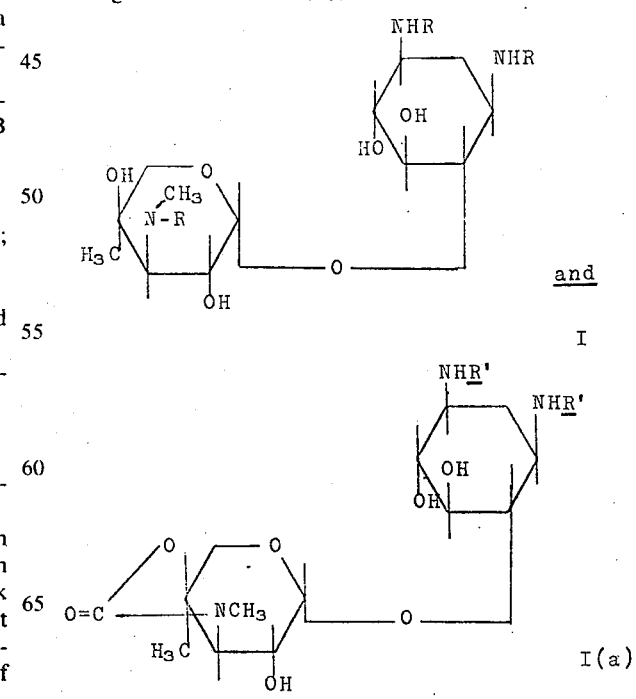

wherein R is a member selected from the group consisting of benzyloxycarbonyl, lower alkoxycarbonyl, (2,2,-2-trichloroethoxy)carbonyl, lower alkanoyl, and aroyl having up to 8 carbon atoms; and R' is a member selected from the group consisting of benzyloxycarbonyl, lower alkoxycarbonyl, (2,2,2-trichloroethoxy)carbonyl;

which comprises the reaction of a pseudotrisaccharide represented by the following formula II, and mixtures thereof:

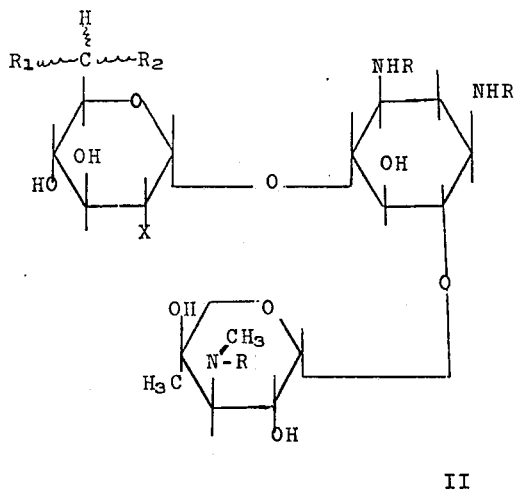

II wherein R is as hereinabove defined; $R_1$ is a member selected from the group consisting of hydrogen and methyl; $R_2$ and X are each selected from the group consisting of -NHR and hydroxy;

with a glycol cleaving reagent selected from the group consisting of a periodate salt and a lead (IV) salt;

and the treatment with a basic reagent selected from the group consisting of alkali metal hydroxides, alkaline metal hydroxides, alkali metal lower alkoxides, quaternary ammonium hydroxides and ion exchange resins in the hydroxide form, of the secodialdehyde derivative of following formula III, and mixtures thereof:

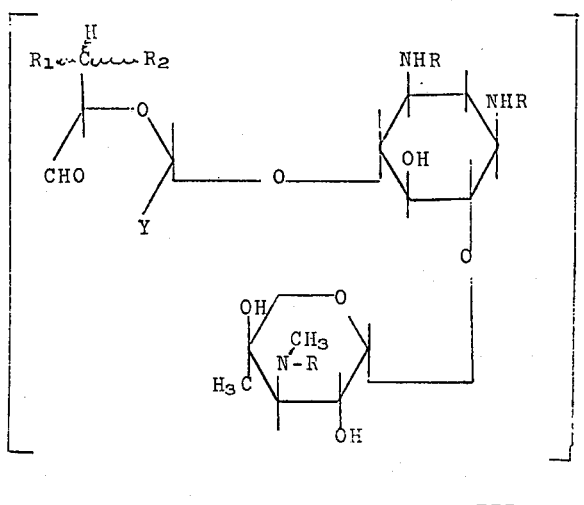

III wherein R, $R_1$ and $R_2$ are as hereinabove defined, and Y is a member selected from the group consisting of —CHO and

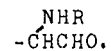

5. The process of claim 4 wherein R and R' are members selected from the group consisting of benzyloxycarbonyl, lower alkoxycarbonyl, and (2,2,2-trichloroethoxy)carbonyl, including the isolation of the protected garamine derivatives of formulae I and I(a).

6. The process of claim 4 followed by treatment of the compounds of formula I and I(a) with alkali whereby garamine is formed.

7. The process of claim 4 wherein said glycol cleaving reagent is an alkali metal meta-periodate and said amino-protecting group is a member selected from the group consisting of carbobenzyloxy, carbomethoxy, carboethoxy, carbo(2,2,2-trichloroethoxy), acetyl and benzoyl.

8. The process of claim 7 wherein R is acetyl, said glycol cleaving reagent is sodium meta-periodate and said basic reagent is a member selected from the group consisting of a sodium hydroxide and an anion exchange resin in the hydroxide form, whereby is obtained 1,3,3'-tri-N-acetylgaramine.

9. The process of claim 7 wherein R is carbobenzyloxy; said glycol cleaving reagent is sodium meta-periodate and said basic reagent is sodium hydroxide, whereby is obtained a mixture comprising 1,3,3'-tri-N-carbobenzyloxygaramine and 1,3-di-N-carbobenzyloxygaramine-3',4'-oxazolidinone.

10. The process of claim 7 wherein R is carbomethoxy; said glycol cleaving reagent is sodium meta-periodate and said basic reagent is sodium methoxide whereby is obtained a mixture comprising 1,3,3'-tri-N-carbomethoxygaramine and a 1,3-di-N-carbomethoxygaramine-3',4'-oxazolidinone.

11. The process of claim 7 wherein said pseudotrisaccharide of formula II is selected from the group consisting of penta-N-acetylantibiotic JI-20A, penta-N-acetylantibiotic JI-20B, and mixtures thereof; said glycol cleaving reagent is sodium meta-periodate; and said basic reagent is selected from the group consisting of sodium hydroxide and an anion exchange resin in the hydroxide form whereby is obtained 1,3,3'-tri-N-acetylgaramine.

12. The process of claim 7 wherein said pseudotrisaccharide of formula II is selected from the group consisting of penta-N-carbomethoxyantibiotic JI-20A, penta-N-carbomethoxyantibiotic JI-20B and mixtures thereof, said glycol cleaving reagent is sodium meta-periodate, and said basic reagent is sodium methoxide whereby is obtained 1,3-dicarbomethoxygaramine-3',4'-oxazolidinone.

13. The process of claim 12 followed by treatment of 1,3-carbomethoxygaramine-3',4'-oxazolidinone with an alkali metal hydroxide or an alkaline earth hydroxide whereby garamine is formed.

* * * * *

UNITED STATES PATENT OFFICE
CERTIFICATE OF CORRECTION

PATENT NO. : 3,878,193
DATED : April 15, 1975
INVENTOR(S) : Hans Reimann

It is certified that error appears in the above-identified patent and that said Letters Patent are hereby corrected as shown below:

Column 1, line 35, "thereby produces" should read ---thereby produced---. Column 2, lines 21 and 22 "barium hydroxide, alkali sodium ethoxide, potassium ethoxide" should read---barium hydroxide, alkali metal lower alkoxides such as sodium methoxide, potassium methoxide, sodium ethoxide, potassium ethoxide---. Column 3, lines 7 and 8 "Oct. 10, 1972, 1972 and now abandoned and are represented by" should read---Oct. 10, 1972 now abandon and are represented by---. Column 3, line 26 "-(1 6)-2-" should read --- -(1→6)-2- ---. Column 3, line 57 "derivatives, e.g." should read ---derivative, e.g.---. Column 7, line 4 "to purity the" should read ---to purify the---. Column 8, line 12 "and carpryloyl" should read ---and capryloyl---. Column 8, line 16 "benzloxycarbonyl" should read ---benzyloxycarbonyl---. Column 8, line 44 "m.p. 216°°-224°C," should read ---m.p. 216°-224°C---. Column 8, line 50 "descrribed to" should read ---described to---. Column 8, line 56 "concentate to" should read ---concentrate to---. Column 9, line 10 "of Penta-A" should read---of Penta-N---. Column 10, line 12 "hydoxide solvent" should read ---hydroxide solvent---. Column 10, line 28 "-N-actylgaramine" should read --- -N-acetylgaramine---. Column 10, line 53 "1,3,2'-tri-" should read ---1,3,3'-tri---. Column 11, lines 7 and 8 "-pent-N-" should read --- -penta-N- ---. Column 11, line 16 "pent-N-" should read ---penta-N- ---. Column 11, line 18 "complex with methyl chloroformate" should read ---complex in acetone/water in the presence of sodium carbonate with methyl chloroformate---. Column 11, line 59 "the 4O-linked-" should read ---the 4-O-linked---. Column 12, lines 4 and 5 "the 4O-linked" should read ---the 4-O-linked---. Column 12, line 59 "garamine-/_3',4'-" should read ---garamine-3',4'---. Column 14, lines 28 and 29 "refilter and precipitate" should read ---refilter the precipitate---. Column 15, lines 36,37,38 "comprising 1,3,3'-D and 1,3-di-N-carbobenzyloxygaramine-3',4'-oxazolidinone, respectively" should read ---com-

UNITED STATES PATENT OFFICE
CERTIFICATE OF CORRECTION

PATENT NO. : 3,878,193
DATED : April 15, 1975
INVENTOR(S) : Hans Reimann

It is certified that error appears in the above-identified patent and that said Letters Patent are hereby corrected as shown below:

prising 1,3,3'-tri-N-carbobenzyloxygaramine and 1,3-di-N-carbobenzyloxy-garamine-3',4'-oxazolidinone, respectively---. Column 16, lines 8 and 9 "Acetylantibiotic G-418 Micromonospora" should read ---Acetylantibiotic G-418---. Column 17, lines 64-67 and Column 18, line 1 "mainly 1,3,6',3"-tetra-N-acetylgentamicin B, 1,3,6',3"-tetra-N-acetylgentamicin B, 1,3,6',3"-tetra-N-acetylgentamicin $B_1$ and 1,3,2',3"-B-tetra-N-acetyl-gentamicin $X_2$" should read ---mainly 1,3,6',3"-tetra-N-acetyl-gentamicin B, 1,3,6',3"-tetra-N-acetylgentamicin $B_1$ and 1,3,2',3"-tetra-N-acetyl-gentamicin $X_2$---. Column 18, line 19 "the 40-linked" should read ---the 4-$\underline{O}$-linked---. Column 19, line 66 "the 40-linked" should read ---the 4-$\underline{O}$-linked---. Column 24, Claim 6, line 19 "formula I and I(a)" should read ---Formulae I and I(a)---. Column 24, Claim 9, line 38 "-3',14'-oxazolidinone" should read ---3',4'-oxazolidinone---.

Signed and Sealed this

Eighteenth Day of January 1977

[SEAL]

Attest:

RUTH C. MASON
Attesting Officer

C. MARSHALL DANN
Commissioner of Patents and Trademarks